United States Patent
Oh et al.

(10) Patent No.: US 12,218,306 B2
(45) Date of Patent: Feb. 4, 2025

(54) ELECTROLYTE FOR LITHIUM SECONDARY BATTERY AND LITHIUM SECONDARY BATTERY INCLUDING THE SAME

(71) Applicant: SK On Co., Ltd., Seoul (KR)

(72) Inventors: Sung Yon Oh, Daejeon (KR); Dong Gun Lee, Daejeon (KR); Jin Haek Yang, Daejeon (KR); In Haeng Cho, Daejeon (KR)

(73) Assignee: SK On Co., Ltd., Seoul (KR)

( * ) Notice: Subject to any disclaimer, the term of this patent is extended or adjusted under 35 U.S.C. 154(b) by 988 days.

(21) Appl. No.: 16/703,161

(22) Filed: Dec. 4, 2019

(65) Prior Publication Data

US 2020/0185773 A1    Jun. 11, 2020

(30) Foreign Application Priority Data

Dec. 10, 2018  (KR) .................. 10-2018-0158334

(51) Int. Cl.
*H01M 10/0525* (2010.01)
*H01M 10/0567* (2010.01)
*H01M 10/0568* (2010.01)
*H01M 10/0569* (2010.01)

(52) U.S. Cl.
CPC ... *H01M 10/0567* (2013.01); *H01M 10/0525* (2013.01); *H01M 10/0568* (2013.01); *H01M 10/0569* (2013.01)

(58) Field of Classification Search
CPC ......... H01M 10/0525; H01M 10/0567; H01M 10/0568; H01M 10/0569
See application file for complete search history.

(56) References Cited

U.S. PATENT DOCUMENTS

| | | | |
|---|---|---|---|
| 2002/0081497 A1 | 6/2002 | Takezawa et al. | |
| 2009/0325065 A1* | 12/2009 | Fujii | H01M 10/0569 429/207 |
| 2013/0295465 A1† | 11/2013 | Kaneko | |
| 2014/0023941 A1† | 1/2014 | Amine | |
| 2015/0340686 A1† | 11/2015 | Sun | |
| 2017/0345581 A1* | 11/2017 | Kim | H01G 11/04 |
| 2018/0342767 A1 | 11/2018 | Ahn et al. | |

FOREIGN PATENT DOCUMENTS

| | | | | |
|---|---|---|---|---|
| CN | 103326068 A | | 9/2013 | |
| CN | 105406126 A | | 3/2016 | |
| CN | 108352569 A | | 7/2018 | |
| CN | 108365265 A | * | 8/2018 | ........ H01M 10/0525 |
| JP | 2013161706 A | | 8/2013 | |
| JP | 2014179247 A | | 9/2014 | |
| WO | 2016088837 A1 | | 6/2016 | |

OTHER PUBLICATIONS

Ashani, Yacov, et al., "Inhibition of Cholinesterase by 1,3,2-Dioxaphosphorinane 2 Oxide Derivatives." Biochemistry, 1972, vol. 11, No. 19, pp. 3518-3523.†

* cited by examiner
† cited by third party

*Primary Examiner* — Osei K Amponsah
(74) *Attorney, Agent, or Firm* — The Webb Law Firm

(57) ABSTRACT

Provided are an electrolyte for a secondary battery including a lithium salt, a nonaqueous organic solvent, and a cyclic fluorophosphonate compound, and a lithium secondary battery including the same.

15 Claims, No Drawings

ELECTROLYTE FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2018-0158334 filed Dec. 10, 2018, the disclosure of which is hereby incorporated by reference in its entirety.

TECHNICAL FIELD

The following disclosure relates to an electrolyte for a lithium secondary battery and a lithium secondary battery including the same.

BACKGROUND

Recently, as portable electronic devices have been widely supplied and become smaller, thinner and more lightweight, research on a secondary battery used as a power source thereof, which has a small size, is lightweight, and may be charged and discharged for a long time, has also been actively conducted.

A lithium secondary battery produces electric energy by oxidation and reduction reactions when lithium ions are intercalated into and deintercalated from the cathodes and anodes, and is manufactured by filling an organic electrolyte or a polymer electrolyte between the cathodes and anodes, using a material into and from which lithium ions may be intercalated and deintercalated as the cathodes and anodes.

The organic electrolyte which is currently widely used may include ethylene carbonate, propylene carbonate, dimethoxyethane, gamma-butyrolactone, N,N-dimethylformamide, tetrahydrofuran, acetonitrile, or the like. However, since the organic electrolyte generally easily volatilizes and is highly inflammable, when the organic electrolyte is applied to a lithium ion secondary battery, there were problems in stability at a high temperature, such as ignition due to internal short circuit at the time of internal heat generation by overcharge and overdischarge.

In addition, in the lithium secondary battery, lithium ions from a lithium metal oxide which is a cathode at initial charge move to a carbon electrode which is an anode and are intercalated in carbon, in which lithium has strong reactivity so that a surface of a carbon particle, which is an anode active material, and an electrolyte are reacted, while a coating film which is referred to as a solid electrolyte interface (SEI) film is formed on an anode surface.

Performance of the lithium secondary battery greatly depends on a configuration of the organic electrolyte and the SEI film formed by the reaction of the organic electrolyte and the electrode. That is, the SEI film formed inhibits a side reaction of a carbon material and an electrolyte solvent, for example, decomposition of the electrolyte on the surface of the carbon particle which is the anode, prevents collapse of an anode material due to co-intercalation of the electrolyte solvent into the anode material, and also fulfills the conventional role as a lithium ion tunnel, thereby minimizing battery performance degradation.

However, as charge and discharge of the lithium secondary battery proceed, a cathode active material structurally collapses, so that metal ions are eluted from a cathode surface, and the eluted metal ions are electrodeposited on an anode to deteriorate the anode. This deterioration phenomenon tends to increase the potential of the cathode or be further accelerated when the battery is exposed to a high temperature.

Accordingly, various studies for developing a new organic electrolyte including various additives for stabilizing the SEI film have been attempted.

Meanwhile, as a cathode active material of the lithium secondary battery, a lithium-containing cobalt oxide (Li-$CoO_2$) is mainly used, and additionally, a lithium-containing manganese oxide such as $LiMnO_2$ having a layered crystal structure and $LiMn_2O_4$ having a spinel crystal structure, and a lithium-containing nickel oxide ($LiNiO_2$) are also used.

A $LiNiO_2$-based cathode active material shows a rapid phase transition of a crystal structure depending on a volume change accompanied by a charge-discharge cycle, and when the $LiNiO_2$-based cathode active material is exposed to air and moisture, chemical resistance on the surface thereof is rapidly deteriorated, and an excessive amount of gas is produced during storage and cycles, and thus, due to these problems, commercialization thereof is currently limited.

Thus, a lithium transition metal oxide in which nickel is partially substituted by other transition metals such as manganese and cobalt has been suggested. The metal-substituted nickel-based lithium transition metal oxide has an advantage of better cycle characteristics and capacity characteristics, but in this case also, in long-term use, the cycle characteristics are rapidly deteriorated and the problems such as swelling by gassing in the battery and low chemical stability, are not sufficiently solved. In particular, a lithium nickel-based transition metal oxide having a high content of nickel produces an excessive amount of gas during storage or a cycle, so that a serious battery swelling phenomenon is shown and stability at a high temperature is low.

Accordingly, in order to solve the problem of stability at a high temperature while using the lithium nickel-based cathode active material which is appropriate for a higher capacity, a solution to improve a life characteristics and stability at a high temperature of a battery by adding vinylene carbonate, vinyl ethylene carbonate, or the like which is known in the art as an electrolyte additive to form the SEI film has been suggested.

However, when these materials are used for a battery including the nickel-based lithium transition metal oxide as a cathode active material, there was a problem that the swelling phenomenon and deteriorated stability at a high temperature became further serious. That is, though nickel-based lithium transition metal oxide having a high content of nickel has a merit of implementing a high-capacity battery, the nickel cation is eluted from the cathode into the electrolyte and reacts with the SEI film in the anode to decompose the SEI film, causing a part of the anode active material to be exposed to the electrolyte to cause a side reaction, thereby deteriorating stability at a high temperature and life characteristics such as producing a selling phenomenon at a high temperature, and increasing resistance.

Accordingly, a new electrolyte which interacts with transition metal ions such as nickel cations eluted into the electrolyte to stabilize the ions, so as to decrease resistance and improve stability of the SEI film, thereby preventing reduction of the stability at a high temperature and life characteristics of a lithium secondary battery, is required.

SUMMARY

An embodiment of the present invention is directed to providing an electrolyte for a lithium secondary battery which improves stability and durability of an SEI film of an anode, thereby minimizing a thickness increase rate during storage at a high temperature to improve stability at a high temperature, and a lithium secondary battery including the same.

In one general aspect, an electrolyte for a secondary battery includes:

a lithium salt;

a nonaqueous organic solvent; and a cyclic fluorophosphonate compound represented by the following Chemical Formula 1:

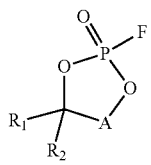

[Chemical Formula 1]

wherein $R_1$ and $R_2$ are independently of each other hydrogen, C1-C10alkyl, halogen, C1-C10alkoxy, C3-C10cycloalkyl, or C6-C20aryl, and the alkyl, alkoxy, cycloalkyl, or aryl may be further substituted by one or more selected from the group consisting of C1-C10alkyl, halogen, haloC1-C10alkyl, C1-C10alkoxy, C1-C10alkoxyC1-C10alkyl, C3-C10cycloalkyl, and C6-C20aryl;

A is $-(CR^aR^b)_m-$, C3-C10cycloalkylene, or C6-C20arylene, and the cycloalkylene or arylene may be further substituted by one or more selected from the group consisting of C1-C10alkyl, halogen, haloC1-C10alkyl, C1-C10alkoxy, C1-C10alkoxyC1-C10alkyl, C3-C10cycloalkyl, and C6-C20aryl;

$R^a$ and $R^b$ are independently of each other hydrogen, C1-C10alkyl, halogen, C1-C10alkoxy, C3-C10cycloalkyl, or C6-C20aryl, and the alkyl, alkoxy, cycloalkyl, or aryl may be further substituted by one or more selected from the group consisting of C1-C10alkyl, halogen, haloC1-C10alkyl, C1-C10alkoxy, C1-C10alkoxyC1-C10alkyl, C3-C10cycloalkyl, and C6-C20aryl; and m is an integer of 1 to 5.

In the electrolyte for a lithium secondary battery according to an exemplary embodiment, the cyclic fluorophosphonate compound may be preferably represented by the following Chemical Formula 2 or 3:

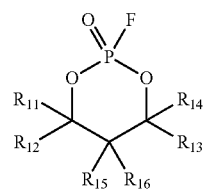

[Chemical Formula 2]

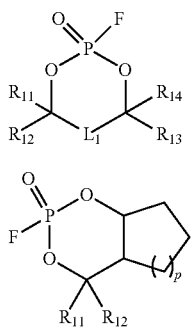

[Chemical Formula 3]

wherein $R_{11}$, $R_{12}$, $R_{13}$, and $R_{14}$ are independently of one another hydrogen, C1-C10alkyl, or halogen, and the alkyl may be further substituted by one or more selected from the group consisting of halogen, C1-C10alkoxy, C3-C10cycloalkyl, and C6-C20aryl;

$L_1$ is $-(CR^cR^d)_n-$;

$R^c$ and $R^d$ are independently of each other hydrogen, C1-C10alkyl, or halogen, and the alkyl may be further substituted by one or more selected from the group consisting of halogen, C1-C10alkoxy, C3-C10cycloalkyl, and C6-C20aryl; and n is an is an integer of 0 to 3, and p is an integer of 1 to 3.

In the electrolyte for a lithium secondary battery according to an exemplary embodiment, the cyclic fluorophosphonate compound may be more preferably represented by the following Chemical Formula 4:

[Chemical Formula 4]

wherein $R_{11}$ to $R_{16}$ are independently of one another hydrogen, C1-C7alkyl, halogen, or C1-C7alkoxyC1-C7alkyl.

In the electrolyte for a lithium secondary battery according to an exemplary embodiment, the cyclic fluorophosphonate compound may be one or more selected from the following structures:

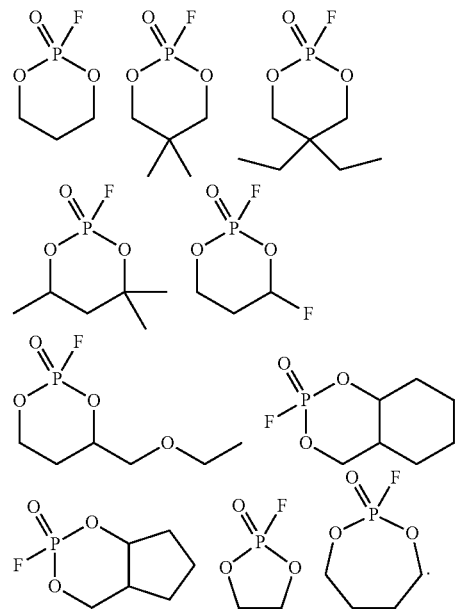

In the electrolyte for a lithium secondary battery according to an exemplary embodiment, the cyclic fluorophosphonate compound may be included at 0.1 to 5.0 wt %, based on a total weight of the electrolyte.

In the electrolyte for a lithium secondary battery according to an exemplary embodiment, the electrolyte may further include one or two or more additives selected from the group consisting of oxalatoborate-based compounds, oxalatophosphate-based compounds, fluorine-substituted carbonate-based compounds, vinylidene carbonate-based compounds, and sulfinyl group-containing compounds.

In the electrolyte for a lithium secondary battery according to an exemplary embodiment, the sulfinyl group-containing compound may be one or two or more selected from the group consisting of sulfone-based compounds, sulfite-based compounds, sulfonate-based compounds, sultone-based compounds, and sulfate-based compounds.

In the electrolyte for a lithium secondary battery according to an exemplary embodiment, the electrolyte may further include two or more additives selected from the group consisting of fluorine-substituted carbonate-based compounds, vinylidene carbonate-based compounds, sultone-based compounds, and sulfate-based compounds.

In the electrolyte for a lithium secondary battery according to an exemplary embodiment, the electrolyte may further include any one or two or more additives selected from the group consisting of lithium difluoro(oxalato)borate, lithium bis(oxalato)borate, lithium tetrafluoro(oxalato)phosphate, lithium difluoro bis(oxalato)phosphate, fluoroethylenecarbonate, difluoroethylenecarbonate, fluorodimethylcarbonate, fluoroethylmethylcarbonate, vinylene carbonate, vinyl ethylene carbonate, dimethyl sulfone, diethyl sulfone, ethyl methyl sulfone, methyl vinyl sulfone, divinyl sulfone, ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, methyl methanesulfonate, ethyl methanesulfonate, methyl ethanesulfonate, propyl methanesulfonate, methyl propanesulfonate, ethyl propanesulfonate, vinyl methanesulfonate, allyl methanesulfonate, vinyl benzenesulfonate, allyl prop-2-enesulfonate, ethanesultone, 1,3-propanesultone, 1,4-butanesultone, ethenesultone, 1,3-propenesultone, 3-fluoro-1,3-propanesultone, 1,4-butenesultone, ethylene sulfate, propylene sulfate, 2,3-butylene sulfate, 1,3-propylene sulfate, and 1,3-butylene sulfate.

In the electrolyte for a lithium secondary battery according to an exemplary embodiment, the additive may be included at 0.1 to 5.0 wt %, based on the total weight of the electrolyte.

In the electrolyte for a lithium secondary battery according to an exemplary embodiment, the nonaqueous organic solvent may be selected from the group consisting of cyclic carbonate-based solvents, linear carbonate-based solvents, and mixed solvents thereof; the cyclic carbonate may be selected from the group consisting of ethylene carbonate, propylene carbonate, butylene carbonate, vinylene carbonate, vinyl ethylene carbonate, fluoroethylene carbonate and mixtures thereof; and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and mixtures thereof.

In the electrolyte for a lithium secondary battery according to an exemplary embodiment, the nonaqueous organic solvent may have a mixed volume ratio of the linear carbonate solvent to the cyclic carbonate solvent of 1:1 to 9:1.

In the electrolyte for a lithium secondary battery according to an exemplary embodiment, the lithium salt may be one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are independently of each other a natural number), LiCl, LiI, and $LiB(C_2O_4)_2$.

In the electrolyte for a lithium secondary battery according to an exemplary embodiment, the lithium salt may be present at a concentration of 0.1 to 2.0 M.

In another general aspect, a lithium secondary battery includes a cathode, an anode, and the electrolyte for a lithium secondary battery of the present invention.

In the lithium secondary battery according to an exemplary embodiment, the cathode may include a composite metal oxide of at least one transition metal selected from the group consisting of cobalt, manganese, and nickel with lithium as a cathode active material, and preferably the cathode active material may be a lithium-nickel-cobalt-manganese-based composite oxide.

In the lithium secondary battery according to an exemplary embodiment, the lithium-nickel-cobalt-manganese-based composite oxide may be $Li_x(Ni_aCo_bMn_c)O_2$ ($0.5<x<1.3$, $0<a<1$, $0<b<1$, $0<c<1$, and $a+b+c=1$), $Li_x(Ni_aCo_bMn_c)O_4$ ($0.5<x<1.3$, $0<a<2$, $0<b<2$, $0<c<2$, and $a+b+c=2$), or a mixture thereof.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be described in detail. Technical terms and scientific terms used herein have the general meaning understood by those skilled in the art to which the present invention pertains unless otherwise defined, and a description for the known function and configuration which may unnecessarily obscure the gist of the present invention will be omitted in the following description.

"Alkyl" described herein includes both a linear form and a branched form.

In addition, "aryl" described herein refers to an organic radical derived from aromatic hydrocarbon by removal of one hydrogen, including a single- or fused ring system containing appropriately 4 to 7, preferably 5 or 6 ring atoms in each ring, and even a form in which a plurality of aryls are linked by a single bond. Specific examples thereof include phenyl, naphthyl, biphenyl, anthryl, indenyl, fluorenyl, and the like, but are not limited thereto.

"Cycloalkyl" described herein means a saturated hydrocarbon ring, and preferably five to seven-membered alicyclic ring, and also includes the case in which an aromatic or an alicyclic ring is fused.

"Discharge" described herein means a process in which lithium ions are deintercalated from an anode, and "charge" means a process in which lithium ions are intercalated into an anode.

Hereinafter, the electrolyte for a secondary battery and the lithium secondary battery including the same according to an exemplary embodiment of the present invention will be described in detail.

The present invention relates to an electrolyte for a lithium secondary battery for providing a battery having excellent storage characteristics at a high temperature, and the electrolyte for a secondary battery of the present invention includes: a lithium salt; a nonaqueous organic solvent; and a cyclic fluorophosphonate compound represented by the following Chemical Formula 1.

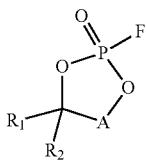

[Chemical Formula 1]

wherein $R_1$ and $R_2$ are independently of each other hydrogen, C1-C10alkyl, halogen, C1-C10alkoxy, C3-C10cycloalkyl, or C6-C20aryl, and the alkyl, alkoxy, cycloalkyl, or aryl may be further substituted by one or more selected from the group consisting of C1-C10alkyl, halogen, haloC1-C10alkyl, C1-C10alkoxy, C1-C10alkoxyC1-C10alkyl, C3-C10cycloalkyl, and C6-C20aryl;

A is $-(CR^aR^b)_m-$, C3-C10cycloalkylene, or C6-C20arylene, and the cycloalkylene or arylene may be further substituted by one or more selected from the group consisting of C1-C10alkyl, halogen, haloC1-C10alkyl, C1-C10alkoxy, C1-C10alkoxyC1-C10alkyl, C3-C10cycloalkyl, and C6-C20aryl;

$R^a$ and $R^b$ are independently of each other hydrogen, C1-C10alkyl, halogen, C1-C10alkoxy, C3-C10cycloalkyl, or C6-C20aryl, and the alkyl, alkoxy, cycloalkyl, or aryl may be further substituted by one or more selected from the group consisting of C1-C10alkyl, halogen, haloC1-C10alkyl, C1-C10alkoxy, C1-C10alkoxyC1-C10alkyl, C3-C10cycloalkyl, and C6-C20aryl; and m is an integer of 1 to 5.

Meanwhile, a structural collapse of the cathode active material or a chemical dissolution reaction of the cathode active material by an electrolyte occurs during a repetitive process of charge and discharge, so that transition metal ions may be eluted from the cathode active material, which causes a phenomenon in which performance of the cathode itself is deteriorated or eluted transition metal ions are precipitated on the surface of the anode to be electrodeposited, and in addition, an excessive amount of gas is produced to cause a serious battery swelling phenomenon, resulting in deteriorated performance of the battery.

In order to solve these problems, the electrolyte for a secondary battery of the present invention includes the cyclic fluorophosphonate compound of the Chemical Formula 1. The cyclic fluorophosphonate compound of Chemical Formula 1 included in the electrolyte for a secondary battery of the present invention interacts with the transition metal ions eluted from the cathode to stabilize the ions to lower battery resistance, and also, may be decomposed in the anode to form the SEI film on the surface of the anode stably and firmly. The firm SEI film inhibits decomposition of the electrolyte caused by contact of the electrolyte with the cathode active material and the anode active material to inhibit gassing, thereby inhibiting increased internal resistance of the secondary battery.

Therefore, the lithium secondary battery adopting the electrolyte for a secondary battery including the cyclic fluorophosphonate compound of Chemical Formula 1 may form the stable SEI film formed on the surface of the anode and stabilize transition metal ions eluted from the cathode to prevent a battery swelling phenomenon caused by gassing during storage at a high temperature, whereby a thickness increase rate at a high temperature is significantly decreased and also a capacity retention rate and a capacity recovery rate are improved, and thus, the battery may have excellent storage characteristics at a high temperature. In addition, due to the firm film, when continuous charge and discharge proceed, thermally very stable characteristics are represented, and thus, characteristics at a high temperature may be much improved.

That is, due to the cyclic fluorophosphonate compound of Chemical Formula 1, the SEI film may be firmly formed on the surface of the anode or a protective layer may be formed on the surface of the cathode, thereby having improved thermal stability, and the secondary battery adopting the compound may have significantly improved stability at a high temperature.

In the electrolyte for a lithium secondary battery according to an exemplary embodiment, the cyclic fluorophosphonate compound may be a cyclic fluorophosphonate compound represented by the following Chemical Formula 2 or 3, in terms of chemical stability and electrical properties:

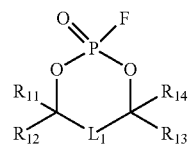

[Chemical Formula 2]

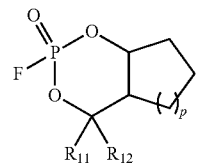

[Chemical Formula 3]

wherein $R_{11}$, $R_{12}$, $R_{13}$, and $R_{14}$ are independently of one another hydrogen, C1-C10alkyl, or halogen, and the alkyl may be further substituted by one or more selected from the group consisting of halogen, C1-C10alkoxy, C3-C10cycloalkyl, and C6-C20aryl;

$L_1$ is $-(CR^cR^d)_n-$;

$R^c$ and $R^d$ are independently of each other hydrogen, C1-C10alkyl, or halogen, and the alkyl may be further substituted by one or more selected from the group consisting of halogen, C1-C10alkoxy, C3-C10cycloalkyl, and C6-C20aryl; and n is an is an integer of 0 to 3, and p is an integer of 1 to 3.

In the electrolyte for a lithium secondary battery according to an exemplary embodiment, more preferably, the cyclic fluorophosphonate compound may be a cyclic fluorophosphonate compound represented by the following Chemical Formula 4, in terms of storage characteristics at a high temperature:

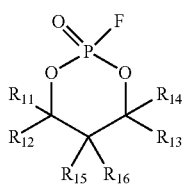

[Chemical Formula 4]

wherein $R_{11}$ to $R_{16}$ are independently of one another hydrogen, C1-C7alkyl, halogen, or C1-C7alkoxyC1-C7alkyl.

More specifically, the cyclic fluorophosphonate compound may be one or more selected from the following structures, but is not limited thereto:

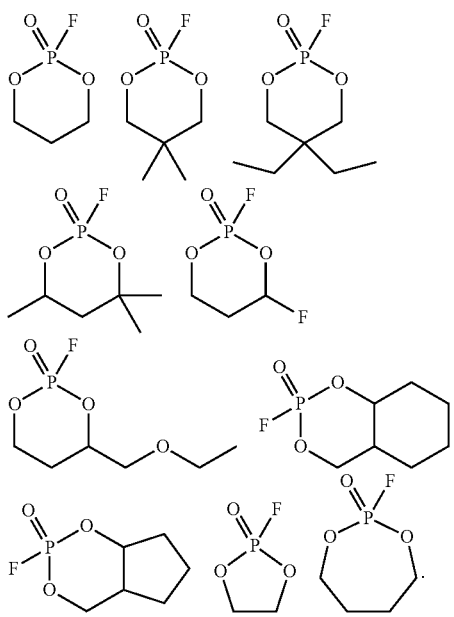

In the electrolyte for a lithium secondary battery according to an exemplary embodiment, the cyclic fluorophosphonate compound may be included at 0.1 to 5.0 wt %, in terms of improving stability at a high temperature and a capacity retention rate and preventing deterioration of lithium secondary battery characteristics due to rapid life deterioration occurrence and the like, and more preferably, may be included at 0.5 to 3.0 wt %, in terms of the stability at a high temperature, based on the total weight of the electrolyte.

In the electrolyte for a lithium secondary battery according to an exemplary embodiment, the electrolyte may further include one or two or more additives selected from the group consisting of oxalatoborate-based compounds, oxalatophosphate-based compounds, fluorine-substituted carbonate-based compounds, vinylidene carbonate-based compounds, and sulfinyl group-containing compounds, in order to improve a battery life or improve durability during storage at a high temperature.

The oxalatoborate-based compound may be a compound represented by the following Chemical Formula A or lithium bis(oxalato)borate ($LiB(C_2O_4)_2$, LiBOB):

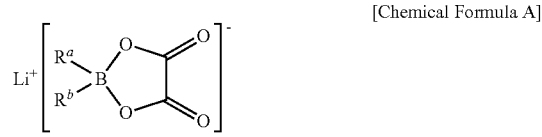

[Chemical Formula A]

wherein $R^a$ and $R^b$ are independently of each other halogen or haloC1-C10alkyl.

Specific examples of the oxalatoborate-based additive may include lithium difluoro (oxalato)borate ($LiB(C_2O_4)F_2$, LiDFOB), lithium bis(oxalato)borate ($LiB(C_2O_4)_2$, LiBOB), or the like.

The oxalatophosphate-based additive may be a compound represented by the following Chemical Formula B or lithium difluoro bis(oxalato)phosphate ($LiPF_2(C_2O_4)_2$, LiDFBOP):

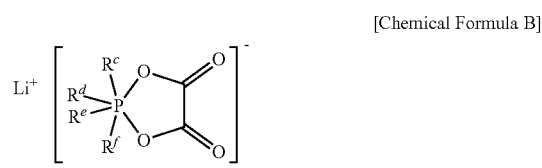

[Chemical Formula B]

wherein $R^c$ to $R^f$ are independently of one another halogen or haloC1-C10alkyl.

Specific examples of the oxalatophosphate-based additive may include lithium tetrafluoro(oxalato)phosphate ($LiPF_4(C_2O_4)$, LiTFOP), lithium difluorobis(oxalato)phosphate ($LiPF_2(C_2O_4)_2$, LiDFBOP), or the like.

The fluorine-substituted carbonate-based compound may be fluoroethylene carbonate (FEC), difluoroethylene carbonate (DFEC), fluorodimethyl carbonate (FDMC), fluoroethyl methyl carbonate (FEMC), or a combination thereof.

The vinylidene carbonate-based compound may be vinylene carbonate (VC), vinyl ethylene carbonate (VEC), or a mixture thereof.

The sulfinyl group (S=O)-containing compound may be a sulfone compound, a sulfite compound, a sulfonate compound, a sultone compound, or a sulfate compound, and these may be used alone or in combination.

The sulfone compound may be specifically a sulfone compound of the following Chemical Formula C:

[Chemical Formula C]

wherein $R^g$ and $R^h$ are independently of each other hydrogen, halogen, C1-C10alkyl, C2-C10alkenyl, haloC1-C10alkyl, haloC2-C10alkenyl, or C6-C12 aryl.

Non-limiting examples of the sulfone compound may include dimethyl sulfone, diethyl sulfone, ethyl methyl sulfone, methyl vinyl sulfone, divinyl sulfone, or the like, but are not limited thereto. In addition, these compounds may be used alone or in combination of two or more.

The sulfite compound may be specifically a sulfite compound of the following Chemical Formula D:

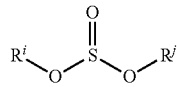

[Chemical Formula D]

wherein $R^i$ and $R^j$ are independently of each other hydrogen, halogen, C1-C10alkyl, C2-C10alkenyl, haloC1-C10alkyl, haloC2-C10alkenyl, or C6-C12aryl, or $R^i$ and $R^j$ may be connected via —$CR^{100}R^{101}CR^{102}R^{103}(CR^{104}R^{105})_m$— to form a ring;

$R^{100}$ to $R^{105}$ are independently of one another hydrogen, C1-C10alkyl, or phenyl; and m is an integer of 0 or 1.

Non-limiting examples of the sulfite compound may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or the like, but are not limited thereto. In addition, these compounds may be used alone or in combination of two or more.

The sulfonate compound may be specifically a sulfonate compound of the following Chemical Formula E:

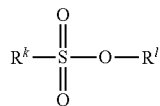

[Chemical Formula E]

wherein $R^k$ and $R^l$ are independently of each other hydrogen, halogen, C1-C10alkyl, C2-C10alkenyl, haloC1-C10alkyl, haloC2-C10alkenyl, or C6-C12aryl.

Non-limiting examples of the sulfonate compound may include methyl methanesulfonate, ethyl methanesulfonate, methyl ethanesulfonate, propyl methanesulfonate, methyl propanesulfonate, ethyl propanesulfonate, vinyl methanesulfonate, allyl methanesulfonate, vinyl benzenesulfonate, allyl prop-2-enesulfonate, or the like, but are not limited thereto. In addition, these compounds may be used alone or in combination of two or more.

The sultone compound may be specifically a sultone compound of the following Chemical Formula F:

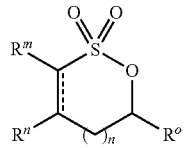

[Chemical Formula F]

wherein

═══ denotes a single bond or a double bond;

$R^m$ to $R^o$ are independently of one another hydrogen, halogen, C1-C10alkyl, C2-C10alkenyl, haloC1-C10alkyl, haloC2-C10alkenyl, or C6-C12aryl; and n is an integer of 0 to 3.

Non-limiting examples of the sultone compound may include ethane sultone, 1,3-propane sultone (PS), 1,4-butane sultone (BS), ethene sultone, 1,3-propene sultone (PES), 3-fluoro-1,3-propane sultone (FPS), 1,4-butene sultone, or the like, but are not limited thereto. In addition, these compounds may be used alone or in combination of two or more.

The sulfate compound may be specifically a cyclic sulfate compound of the following Chemical Formula G:

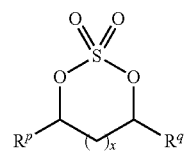

[Chemical Formula G]

wherein $R^p$ and $R^q$ are independently of each other hydrogen, halogen, C1-C10alkyl, C2-C10alkenyl, haloC1-C10alkyl, haloC2-C10alkenyl, or C6-C12aryl; and x is an integer of 0 to 3.

Non-limiting examples of the sulfate compound may include ethylene sulfate (ESA), propylene sulfate, 2,3-butylene sulfate, 1,3-propylene sulfate, 1,3-butylene sulfate, or the like, but are not limited thereto. In addition, these compounds may be used alone or in combination of two or more.

In an exemplary embodiment, more preferably, the electrolyte may further include two or more additives selected from the group consisting of fluorine-substituted carbonate-based compounds, vinylidene carbonate-based compounds, sultone-based compounds, and sulfate-based compounds, and more preferably, the electrolyte may further include two or more additives selected from the group consisting of fluorine-substituted carbonate-based compounds, vinylidene carbonate-based compounds, sultone-based compounds of Chemical Formula F, and cyclic sulfate-based compounds of Chemical Formula G, in terms of stability at a high temperature. Still more preferably, the electrolyte may include all of the fluorine-substituted carbonate-based compound, the vinylidene carbonate-based compound, the sultone-based compound of Chemical Formula F, and the cyclic sulfate-based compound of Chemical Formula G as the additive, in terms of more improved characteristics of the lithium secondary battery at a high temperature.

Specifically, the electrolyte may further include two or more additives selected from the group consisting of fluoroethylene carbonate, difluoroethylene carbonate, fluorodimethyl carbonate, fluoroethylmethyl carbonate, vinylene carbonate, vinyl ethylene carbonate, ethanesultone, 1,3-propanesultone, 1,4-butanesultone, ethenesultone, 1,3-propenesultone, 3-fluoro-1,3-propanesultone, 1,4-butenesultone, ethylene sulfate, propylene sulfate, 2,3-butylene sulfate, 1,3-propylene sulfate, and 1,3-butylene sulfate.

The electrolyte according to an exemplary embodiment may, more preferably, further include fluoroethylene carbonate, vinylene carbonate, 1,3-propanesultone, 1,3-propenesultone, ethylene sulfate, or a mixture thereof, and it is more preferred to include a mixture of fluoroethylene carbonate, vinylene carbonate, 1,3-propanesultone, 1,3-propenesultone, and ethylene sulfate, from the viewpoint that the lithium secondary battery has more improved characteristics at a high temperature.

In an exemplary embodiment, the content of the additive is not significantly limited, but in order to improve characteristics at a high temperature such as stability at a high temperature, storage at a high temperature, and a life at a high temperature within the electrolyte for a secondary battery, the additive may be included at 0.1 to 10.0 wt %, and more preferably 0.1 to 5.0 wt %, based on the total weight of the electrolyte.

In the electrolyte for a lithium secondary battery according to an exemplary embodiment, the nonaqueous organic solvent may include carbonate, ester, ether, or ketone alone or in combination, and it is preferred that the nonaqueous organic solvent is selected from the group consisting of cyclic carbonate-based solvents, linear carbonate-based solvents, and mixed solvents thereof, and it is most preferred that a mixture of a cyclic carbonate-based solvent and a linear carbonate-based solvent is used. The cyclic carbonate solvent has a high polarity, so that it may sufficiently dissociate lithium ions, but has a low ion conductivity due to its high viscosity. Therefore, the cyclic carbonate solvent may be mixed with a linear carbonate solvent having low polarity but low viscosity, thereby optimizing the characteristics of the lithium secondary battery.

The cyclic carbonate may be selected from the group consisting of ethylene carbonate, propylene carbonate, butylene carbonate, vinylene carbonate, vinyl ethylene carbonate, fluoroethylene carbonate, and mixtures thereof, and the linear carbonate may be selected from the group consisting of dimethyl carbonate, diethyl carbonate, dipropyl carbonate, ethylmethyl carbonate, methylpropyl carbonate, methylisopropyl carbonate, ethylpropyl carbonate, and mixtures thereof.

In the electrolyte for a lithium secondary battery according to an exemplary embodiment, the nonaqueous organic solvent, which is a mixed solvent of a cyclic carbonate-based solvent and a linear carbonate-based solvent, may be used at a mixed volume ratio between the linear carbonate solvent and the cyclic carbonate solvent of 1:1 to 9:1, and preferably 1.5:1 to 4:1.

In the electrolyte for a lithium secondary battery according to an exemplary embodiment, the lithium salt may be one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are independently of each other a natural number), LiCl, LiI, and $LiB(C_2O_4)_2$, but is not limited thereto.

The concentration of the lithium salt is preferably within a range of 0.1 to 2.0 M, and more preferably within a range of 0.7 to 1.6 M. When the concentration of the lithium salt is less than 0.1 M, the conductivity of the electrolyte is lowered, so that the performance of the electrolyte is deteriorated, and when the concentration of the lithium salt is more than 2.0 M, the viscosity of the electrolyte is increased, so that the mobility of lithium ions is decreased. The lithium salt serves as a source of lithium ions in the battery, thereby allowing operation of a basic lithium secondary battery.

The electrolyte for a lithium secondary battery of the present invention is stable at a temperature in a range of −20° C. to 60° C. and maintains electrochemically stable characteristics even at a voltage of 4.2 V, and thus, may be applied to all types of lithium secondary batteries such as a lithium ion battery and a lithium polymer battery.

In particular, the electrolyte for a lithium secondary battery according to an exemplary embodiment of the present invention may be driven even at a voltage of 4.2 V or higher, based on a cathode potential.

In addition, the present invention provides a lithium secondary battery including the electrolyte for a lithium secondary battery according to an exemplary embodiment.

Non-limiting examples of the secondary battery according to an exemplary embodiment include a lithium metal secondary battery, a lithium ion secondary battery, a lithium polymer secondary battery, a lithium ion polymer secondary battery, or the like.

The lithium secondary battery of the present invention includes a cathode, an anode, and the electrolyte for a lithium secondary battery according to an exemplary embodiment of the present invention.

Specifically, the cathode according to an exemplary embodiment of the present invention includes a cathode active material capable of intercalating and deintercalating lithium ions, and the cathode active material according to an exemplary embodiment of the present invention is a composite metal oxide of at least one transition metal selected from the group consisting of cobalt (Co), manganese (Mn), and nickel (Ni) with lithium, as a preferred combination with the electrolyte for a lithium secondary battery according to an exemplary embodiment of the present invention, and may be one or two or more selected from the group consisting of a lithium-manganese-based composite oxide, a lithium-cobalt-based composite oxide, a lithium-nickel-based composite oxide, a lithium-nickel-manganese-based composite oxide, a lithium-nickel-cobalt-based composite oxide, a lithium-cobalt-manganese-based composite oxide, and a lithium-nickel-cobalt-manganese-based composite oxide.

In the secondary battery including the cathode including a composite metal oxide of at least one transition metal selected from the group consisting of cobalt (Co), manganese (Mn), and nickel (Ni) with lithium as the cathode active material and the electrolyte for a secondary battery according to an exemplary embodiment of the present invention, the cyclic fluorophosphonate compound of Chemical Formula 1 stabilizes the transition metal ions eluted from the cathode during storage at a high temperature to prevent gassing, thereby effectively inhibiting a swelling phenomenon in which a battery swells, and thus, storage stability at a high temperature of the lithium secondary battery may be improved.

Non-limiting examples of the cathode active material may include any one or a mixture of two or more selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3).

The cathode active material according to an exemplary embodiment may be a lithium-nickel-cobalt-manganese-based composite oxide as the most preferred combination with the electrolyte for a lithium secondary battery according to an exemplary embodiment of the present invention, preferably $Li_x(Ni_aCo_bMn_c)O_2$ (0.5<x<1.3, 0<a<1, 0<b<1, 0<c<1, a+b+c=1), $Li_x(Ni_aCo_bMn_c)O_4$ (0.5<x<1.3, 0<a<2, 0<b<2, 0<c<2, a+b+c=2), or a mixture thereof, and more preferably $Li_x(Ni_aCo_bMn_c)O_2$ wherein $0.90 \le x \le 1.10$, $0.3 \le a \le 0.8$, $0.1 \le b < 0.5$, $0.1 \le c < 0.5$, and $a+b+c=1$.

The cathode active material which is preferably combined with the electrolyte for a lithium secondary battery including the cyclic fluorophosphonate compound, included in the lithium secondary battery according to an exemplary embodiment, particularly the electrolyte for a lithium secondary battery including two or more additional additives selected from the group consisting of a fluorine-substituted carbonate-based compound, a vinylidene carbonate-based compound, a sultone-based compound, and a sulfate-based compound with the cyclic fluorophosphonate compound, may be $Li_x(Ni_aCo_bMn_c)O_2$, wherein $0.90 \le x \le 1.10$, $0.3 \le a \le 0.8$, $0.1 \le b < 0.5$, $0.1 \ge c < 0.5$, and $a+b+c=1$, and more preferably $Li(Ni_aCo_bMn_c)O_2$, wherein $0.3 \le a \le 0.8$, $0.1 \le b < 0.5$, $0.1 \le c < 0.5$, and $a+b+c=1$.

The cathode active material according to an exemplary embodiment may be $LiNi_{0.6}Co_{0.2}Mn_{0.2}O_2$, $LiNi_{0.5}Co_{0.2}Mn_{0.3}O_2$, $LiNi_{0.8}Co_{0.1}Mn_{0.1}O_2$, $LiNi_{1/3}Co_{1/3}Mn_{1/3}O_2$, or a mixture thereof, and more preferably, may be $LiNi_{0.8}Co_{0.1}Mn_{0.1}O_2$, $LiNi_{1/3}Co_{1/3}Mn_{1/3}O_2$, or a mixture thereof.

The anode includes an anode current collector and an anode active material layer formed on the anode current collector, the anode active material layer includes an anode active material capable of intercalating and deintercalating lithium ions, and as the anode active material, carbon materials such as crystalline carbon, amorphous carbon, a carbon composite, and carbon fiber, a lithium metal, an alloy of lithium and another element, and the like may be used. Non-limited examples of the amorphous carbon includes soft carbon (low temperature baked carbon), hard carbon, coke, mesocarbon microbeads (MCMB) baked at 1500° C. or lower, mesophase pitch-based carbon fiber (MPCF), or the like. Non-limiting examples of the crystalline carbon includes graphite-based materials, and specifically natural graphite, graphitized coke, graphitized MCMB, graphitized MPCF, or the like. The carbon materials are preferably a material having a d002 interplanar distance of 3.35 to 3.38 Å, and Lc (crystallite size) by X-ray diffraction of at least 20 nm or more. As other elements forming an alloy with lithium, aluminum, zinc, bismuth, cadmium, antimony, silicon, lead, tin, gallium, or indium may be used.

The cathode or the anode may be prepared by dispersing an electrode active material, a binder, a conductive material, and if necessary, a thickener in a solvent to prepare an electrode slurry composition, and applying the slurry composition on an electrode current collector. As a cathode current collector, aluminum, an aluminum alloy, or the like may be often used, and as an anode current collector, copper, a copper alloy, or the like may be often used. The cathode current collector and the anode current collector may be in the form of foil or mesh.

The binder is a material serving as formation of a paste of the active material, mutual adhesion of the active material, adhesion with the current collector, a buffer effect to expansion and shrinkage of the active material, and the like, and includes for example, polyvinylidene fluoride (PVdF), a copolymer of polyhexafluoropropylene-polyvinylidene fluoride (PVdF/HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene, polyvinyl chloride, polyacrylonitrile, polyvinyl pyridine, a styrene butadiene rubber, an acrylonitrile-butadiene rubber, and the like. The content of the binder is not particularly limited, but may be 0.1 to 30 wt %, and preferably 1 to 10 wt %, relative to the electrode active material. When the content of the binder is too low, the adhesive strength between the electrode active material and the current collector will be insufficient, and when the content of the binder is too high, the adhesive strength will be better, but the content of the electrode active material will be reduced by the increased amount of the binder, and thus, it is disadvantageous for an increased battery capacity.

The conductive material which is used for imparting conductivity to an electrode, may be any material as long as it does not cause any chemical change and is an electron conductive material in a composed battery, and at least one selected from the group consisting of a graphite-based conductive material, a carbon black-based conductive material, a metal, or a metal compound-based conductive material may be used as the conductive material. Examples of the graphite-based conductive material include artificial graphite, natural graphite, or the like, examples of the carbon black-based conductive material include acetylene black, ketjen black, denka black, thermal black, channel black, or the like, and examples of the metal-based or metal compound-based conductive material include a tin, tin oxide, tin phosphate ($SnPO_4$), titanium oxide, potassium titanate, perovskite materials such as $LaSrCoO_3$ or $LaSrMnO_3$. However, the conductive material is not limited thereto.

The content of the conductive material is not particularly limited, but may be preferably 0.1 to 10 wt %, relative to the electrode active material. When the content of the conductive material is less than 0.1 wt %, electrochemical properties are deteriorated, and when the content is more than 10 wt %, energy density per weight may be reduced.

The thickener is not particularly limited as long as it may serve to control the viscosity of an active material slurry, and for example, carboxymethyl cellulose, hydroxylmethyl cellulose, hydroxylethyl cellulose, hydroxypropyl cellulose, or the like may be used.

As the solvent in which the electrode active material, the binder, the conductive material, and the like are dispersed, a nonaqueous solvent or an aqueous solvent is used. The nonaqueous solvent may include N-methyl-2-pyrrolidone (NMP), dimethyl formamide, dimethyl acetamide, N,N-dimethylaminopropylamine, ethylene oxide, tetrahydrofuran, and the like.

The lithium secondary battery according to an exemplary embodiment of the present invention may include a separator which prevents a short circuit between the cathode and the anode and provides an ion channel of lithium ions, and as the separator, a polyolefin-based polymer film such as polypropylene, polyethylene, polyethylene/polypropylene, polyethylene/polypropylene/polyethylene, and polypropylene/polyethylene/polypropylene, or a multiple film, a microporous film, and woven and non-woven fabric thereof may be used. Further, a film in which a resin having excellent stability is coated on a porous polyolefin film may be used.

The lithium secondary battery of the present invention may be formed in other shapes such as cylindrical and pouch, in addition to a square shape. The secondary battery is also appropriate for uses requiring high voltage, high power, and high temperature drive, such as an electric vehicle, in addition to the conventional uses as a mobile phone, a portable computer, or the like. In addition, the secondary battery may be combined with conventional internal combustion engines, fuel cells, supercapacitors, and the like and used for a hybrid vehicle and the like also, and may be used for electric bicycles, machine tools, and other any uses requiring high power, high voltage, and high temperature drive.

Hereinafter, the Examples and Comparative Examples of the present invention will be described. However, the following Examples are only a preferred exemplary embodiment, and the present invention is not limited thereto. Assuming that a lithium salt is all dissociated so that a lithium ion concentration becomes 1.0 M, a basic electrolyte may be formed by dissolving a corresponding amount of a lithium salt such as LiPF$_6$ in a basic solvent to a concentration of 1.0 M.

[Example 1] Synthesis of 2-fluoro-1,3,2-dioxaphosphorinane 2-oxide ($C_3H_6FO_3P$) (Compound 1)

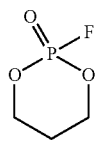

(1)

Acetonitrile (ACN, 40 mL) was added to cesium fluoride (CsF, 4.37 g, 28.8 mmol) under a nitrogen atmosphere and stirred for 15 minutes. Next, 2-chloro-1,3,2-dioxaphosphorinane 2-oxide (4.50 g, 28.8 mmol) was added dropwise for 15 minutes, trifluoroacetic acid (CF$_3$COOH, 0.46 g, 4.03 mmol) was added, and the reactants were further stirred at room temperature for 3 hours. When stirring was completed, a salt (CsCl) produced as a byproduct during the reaction was removed by a filter and the solvent was removed by reduced pressure. The obtained residue was purified by silica gel column chromatography (eluent: 25% EtOAc in hexanes) to obtain 1.89 g (6.5 mmol) of Compound 1 with a yield of 50.3%.

$^1$H NMR (500 MHz, CDCl$_3$) δ 4.59-4.48 (m, 4H), 2.42-2.38 (m, 1H), 1.88-1.85 (m, 1H) ppm.

[Examples 2 to 4, and Comparative Examples 1 to 5] Manufacture of Lithium Secondary Battery Electrolytes were prepared by further adding the components described in following Table 1 to a basic electrolyte (1.0 M LiPF$_6$, EC/EMC=25/75) which is a solution in which LiPF$_6$ is dissolved in a mixed solvent of ethylene carbonate (EC) and ethylmethyl carbonate (EMC) at a volume ratio of 25:75 so that the solution becomes a 1.0 M solution.

A battery to which the nonaqueous electrolyte was applied was manufactured as follows:

LiNi$_{0.8}$Co$_{0.1}$Mn$_{0.1}$O$_2$ and LiNi$_{1/3}$Co$_{1/3}$Mn$_{1/3}$O$_2$ were mixed at a weight ratio of 6:4 and used as a cathode active material, polyvinylidene fluoride (PVdF) was used as a binder, and carbon was used as a conductive material. The cathode active material, the binder, and the conductive material were mixed at a weight ratio of 92:4:4, and dispersed in N-methyl-2-pyrrolidone to prepare a cathode slurry. This slurry was coated on an aluminum foil having a thickness of 20 μm, which was dried and rolled to prepare a cathode.

An artificial graphite as an anode active material, a styrene butadiene rubber (SBR) as a binder, and carboxymethyl cellulose (CMC) as a thickener were mixed at a weight ratio of 96:2:2, and then were dispersed in water to prepare an anode slurry. This slurry was coated on a copper foil having a thickness of 15 μm, which was dried and rolled to prepare an anode.

A film separator made of polyethylene (PE) having a thickness of 25 μm was stacked between the thus-prepared electrodes to form a cell using a pouch having a size of thickness of 8 mm×width of 60 mm×length of 90 mm, and the nonaqueous electrolyte was injected to manufacture a 1.7 Ah grade lithium secondary battery.

Performance of the thus-manufactured 1.7 Ah grade battery was evaluated as follows, and the results are shown in Table 2. Evaluation items were the following:

*Evaluation Items*

1. Thickness increase rate after 8 weeks at 60° C.: when the thickness of the battery after being charged at 4.2V with 1 C CC-CV at room temperature for 3 hours was set as 'A', and the thickness of the battery after being allowed to stand under a exposed normal pressure for 8 weeks in the atmosphere at 60° C. using a closed thermostat was set as 'B', the thickness increase rate was calculated by the following Equation 1. A cell thickness was measured using a flat plate thickness measuring apparatus (manufactured by Misutoyo Corporation, 543-490B).

Thickness increase rate (%)=(B−A)/A×100     [Equation 1]

2. Capacity retention ratio after 8 weeks at 60° C.: a battery was allowed to stand at 60° C. for 8 weeks and then at room temperature for 30 minutes, and calculation was performed by dividing a capacity obtained from 1 C rate CC discharge (2.7 V cut-off) after IR measurement by a capacity measured before storage and the result was shown in a percentage.

Capacity retention ratio of battery (%)=(final capacity/initial capacity)×100(%)

3. Capacity recovery rate after 8 weeks at 60° C. (storage efficiency at high temperature): a battery was allowed to stand at 60° C. for 8 weeks and then discharged with a current of 1 C with CC to 2.7 V, and then a usable capacity (%) relative to an initial capacity was measured.

4. Life at room temperature: A battery was charged at 4.2 V with 1 C CC-CV at room temperature for 3 hours (0.05 C cut-off), and then discharged at 2.7 V with a current of 1 C to 2.7 V, which was performed 1000 times repeatedly. In the above all charge-discharge cycles, the operation was paused for 10 minutes after one charge/discharge cycle. The life characteristics were calculated by the capacity retention ratio defined by the following Equation 2:

Capacity retention rate (%)=[discharge capacity at 1000$^{th}$ cycle/discharge capacity at 1$^{st}$ cycle]×100     [Equation 2]

TABLE 1

| | Electrolyte composition (total 100 wt %) |
|---|---|
| Example 2 | Basic electrolyte + 0.5 wt % of cyclic fluorophosphonate compound (1) |
| Example 3 | Basic electrolyte + 1.0 wt % of cyclic fluorophosphonate compound (1) |
| Example 4 | Basic electrolyte + 2.0 wt % of cyclic fluorophosphonate compound (1) |
| Comparative Example 1 | Basic electrolyte |

TABLE 1-continued

| | Electrolyte composition (total 100 wt %) |
|---|---|
| Comparative Example 2 | Basic electrolyte + 1.0 wt % of Comparative Compound A |
| Comparative Example 3 | Basic electrolyte + 1.0 wt % of Comparative Compound B |
| Comparative Example 4 | Basic electrolyte + 1.0 wt % of Comparative Compound C |
| Comparative Example 5 | Basic electrolyte + 1.0 wt % of Comparative Compound D |
| Basic electrolyte: | 1.0M LiPF6, EC/EMC = 25/75 |
| Compound (1): | 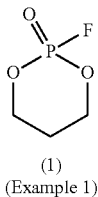 (1) (Example 1) |
| Comparative Compound A: | 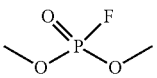 |
| Comparative Compound B: | 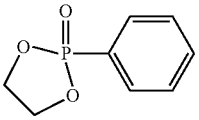 [SMILES: O=P1(c2ccccc2)OCCO1] |
| Comparative Compound C: | 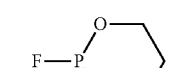 |
| Comparative Compound D: | 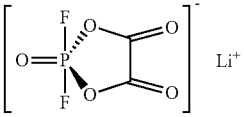 |
| VC: | vinylene carbonate |
| FEC: | fluoroethylene carbonate |
| PRS: | 1,3-propene sultone |
| PS: | 1,3-propane sultone |
| ESA: | ethylene sulfate |

TABLE 2

| Lithium secondary battery | Initial thickness [mm] | Thickness after 8 weeks at 60° C. [mm] | Thickness increase rate [%] | After 8 weeks at 60° C. Capacity retention rate [%] | After 8 weeks at 60° C. Capacity recovery rate [%] | Room temperature life: Capacity retention rate [%] |
|---|---|---|---|---|---|---|
| Example 2 | 5.20 | 7.28 | 40.0 | 54.9 | 52.0 | 74.1 |
| Example 3 | 5.23 | 6.90 | 31.9 | 57.1 | 56.5 | 76.0 |
| Example 4 | 5.25 | 6.79 | 29.3 | 60.6 | 58.3 | 76.9 |
| Comparative Example 1 | 5.20 | 7.45 | 43.3 | 49.1 | 47.8 | 73.0 |
| Comparative Example 2 | 5.23 | 7.50 | 43.4 | 50.5 | 49.0 | 70.3 |
| Comparative Example 3 | 5.26 | 7.76 | 47.5 | 49.1 | 48.0 | 74.3 |
| Comparative Example 4 | 5.25 | 7.40 | 41.0 | 51.0 | 49.1 | 72.1 |
| Comparative Example 5 | 5.25 | 8.00 | 52.4 | 45.3 | 43.9 | 76.0 |

As seen from the above Table 2, it is recognized that the lithium secondary battery adopting the electrolyte including the cyclic fluorophosphonate compound which is a specific additive had a very low thickness increase rate even after being allowed to stand at 60° C. for 8 weeks, and thus, had a very high stability at a high temperature.

However, it is recognized that the lithium secondary batteries of Comparative Examples 1 to 5 which adopted an electrolyte including no cyclic fluorophosphonate compound which is the specific additive of the present invention had a high thickness increase rate after being allowed to stand at 60° C. for 8 weeks, thereby having significantly deteriorated stability at high temperature, and also having greatly deteriorated capacity retention rate and capacity recovery rate.

Thus, it is recognized therefrom that the lithium secondary battery adopting the electrolyte including the cyclic fluorophosphonate compound which is the specific additive of the present invention had a significantly low thickness increase rate at a high temperature, and also had a high capacity retention rate and a high capacity recovery rate, thereby significantly improving stability at a high temperature.

[Example 5, and Comparative Examples 6 and 7]
Manufacture of Lithium Secondary Battery Electrolytes were prepared by further adding the components described in following Table 3 to a basic electrolyte (1.0 M LiPF$_6$, EC/EMC=25/75) which is a solution in which LiPF$_6$ is dissolved in a mixed solvent of ethylene carbonate (EC) and ethylmethyl carbonate (EMC) at a volume ratio of 25:75 so that the solution becomes a 1.0 M solution. The nonaqueous electrolyte prepared above was used to manufacture a 1.7 Ah grade battery in the same manner as in Example 2, the battery performance was evaluated, and the results are shown in the following Table 3.

TABLE 3

| | Electrolyte composition (total 100 wt %) |
|---|---|
| Example 5 | Basic electrolyte + 1.0 wt % of cyclic fluorophosphonate compound (1) + 0.5 wt % of VC + 1.0 wt % of FEC + 0.3 wt % of PRS + 0.5 wt % of PS + 0.5 wt % of ESA |

TABLE 3-continued

| | Electrolyte composition (total 100 wt %) |
|---|---|
| Comparative Example 6 | Basic electrolyte + 0.5 wt % of VC + 1.0 wt % of FEC + 0.3 wt % of PRS + 0.5 wt % of PS + 0.5 wt % of ESA |
| Comparative Example 7 | Basic electrolyte + 1.0 wt % of Comparative Compound A + 0.5 wt % of VC + 1.0 wt % of FEC + 0.3 wt % of PRS + 0.5 wt % of PS + 0.5 wt % of ESA |
| Basic electrolyte: | 1.0M LiPF6, EC/EMC = 25/75 |

Compound (1):

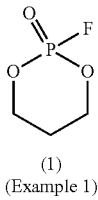

(1)
(Example 1)

Comparative Compound A:

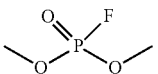

| VC: | vinylene carbonate |
|---|---|
| FEC: | fluoro ethylene carbonate |
| PRS: | 1,3-propene sultone |
| PS: | 1,3-propane sultone |
| ESA: | ethylene sulfate |

TABLE 4

| | Thickness after | | | After 8 weeks at 60° C. | | Room temperature life: |
|---|---|---|---|---|---|---|
| Lithium secondary battery | Initial thickness [mm] | 8 weeks at 60° C. [mm] | Thickness increase rate [%] | Capacity retention rate [%] | Capacity recovery rate [%] | Capacity retention rate [%] |
| Example 5 | 5.38 | 5.78 | 7.5 | 65.2 | 63.2 | 83.6 |
| Comparative Example 6 | 5.31 | 6.11 | 15.1 | 55.4 | 54.2 | 80.2 |
| Comparative Example 7 | 5.33 | 5.98 | 12.2 | 57.3 | 55.5 | 77.9 |

From the above Table 4, it is recognized that the electrolyte for a secondary battery including the cyclic fluorophosphonate compound which is the specific additive of the present invention further includes two or more additives selected from the group consisting of fluorine-substituted carbonate-based compounds, vinylidene carbonate-based compounds, sultone-based compounds, and sulfate-based compounds, as an additional additive, thereby having improved storage stability at a high temperature. That is, it is recognized that the lithium secondary battery of Example 5 adopting the electrolyte for a secondary battery including the cyclic fluorophosphonate compound which is the specific additive of the present invention and two or more further additives selected from the group consisting of fluorine-substituted carbonate-based compounds, vinylidene carbonate-based compounds, sultone-based compounds, and sulfate-based compounds had very low thickness increase rate even after being allowed to stand at 60° C. for 8 weeks, and also had a high capacity retention rate and a high capacity recovery rate, and thus, had excellent stability at a high temperature. In addition, it is recognized that the cycle life characteristics at room temperature also become excellent.

In particular, it is recognized that the lithium secondary battery adopting the electrolyte including all of the cyclic fluorophosphonate compound which is the specific additive of the present invention and the further additives, VC, FEC, PRS, PS, and ESA had more improved stability at a high temperature.

That is, the cyclic fluorophosphonate compound which is the specific additive included in the electrolyte for a secondary battery of the present invention interacts with the transition metal ions eluted from the cathode of the lithium secondary battery including the lithium-nickel-cobalt-manganese-based composite oxide as the cathode active material and stabilizes the transition metal ions to lower battery resistance and also prevent a battery swelling phenomenon during storage at a high temperature, thereby representing a characteristic inhibiting change in a battery thickness at a high temperature. In addition, it is recognized that when the electrolyte of the present invention is adopted, basic performance such as a high-efficiency charge and discharge characteristic is maintained well, while significantly excellent high temperature characteristics are shown.

The electrolyte for a lithium secondary battery according to the present invention includes a cyclic fluorophosphonate compound, whereby a thickness increase rate at a high temperature is significantly lowered, and also, a capacity retention rate and a capacity recovery rate are improved, and thus, storage characteristics at a high temperature are excellent.

The cyclic fluorophosphonate compound of Chemical Formula 1 included in the electrolyte for a secondary battery of the present invention interacts with the transition metal ions eluted from the cathode to stabilize the ions to lower battery resistance, and also may prevent a battery swelling phenomenon during storage at a high temperature.

In addition, the cyclic fluorophosphonate compound of Chemical Formula 1 included in the electrolyte for a secondary battery of the present invention is decomposed in the anode, thereby forming the SEI film stably and firmly on the surface of the anode.

More specifically, the cyclic fluorophosphonate compound has a cyclic structure containing fluorophosphonate

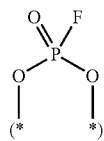

in a ring and is chemically stable, and thus, the electrolyte including the compound lowers battery resistance and also further stabilizes the transition metal ions eluted from the cathode to minimize a thickness increase rate at a high temperature.

That is, the cyclic fluorophosphonate compound included in the electrolyte of the present invention stabilizes nickel, cobalt, or manganese ions which are the ions of the transition metal of the cathode of the lithium secondary battery including a composite metal oxide of at least one transition metal selected from the group consisting of cobalt, manganese, and nickel with lithium as a cathode active material, thereby significantly inhibiting change in the battery thickness at a high temperature.

In addition, the electrolyte for a lithium secondary battery according to the present invention further includes one or two or more additional additives selected from the group consisting of oxalatoborate-based compounds, oxalatophosphate-based compounds, fluorine-substituted carbonate-based compounds, vinylidene carbonate-based compounds, and sulfinyl group-containing compounds, with the cyclic fluorophosphonate compound, thereby having better stability at a high temperature.

In addition, the lithium secondary battery of the present invention adopts the electrolyte for a secondary battery of the present invention including the cyclic fluorophosphonate compound, thereby forming a stable SEI film formed on the surface of the anode, stabilizing transition metal ions eluted from the cathode to prevent a battery swelling phenomenon caused by gassing during storage at a high temperature, and thus, the battery maintains basic performance such as high-efficiency charge and discharge characteristics and life characteristics well, while representing a significantly low thickness increase rate at a high temperature, and also having a high capacity retention rate and a high capacity recovery rate, thereby having excellent storage stability at a high temperature.

As described above, though the exemplary embodiments of the present invention have been described in detail, a person skilled in the art may make various variations of the present invention without departing from the spirit and the scope of the present invention, as defined in the claims which follow. Accordingly, any modification of the following Examples of the present invention may not depart from the technique of the present invention.

What is claimed is:

1. An electrolyte for a secondary battery, the electrolyte comprising:
   a lithium salt;
   a nonaqueous organic solvent; and
   a cyclic fluorophosphonate compound represented by the following Chemical Formula 1:

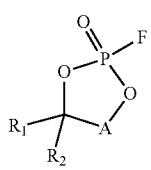

[Chemical Formula 1]

wherein
$R_1$ and $R_2$ are independently of each other hydrogen, C1-C10alkyl, halogen, C1-C10alkoxy, C3-C10cycloalkyl, or C6-C20aryl, and the alkyl, alkoxy, cycloalkyl, or aryl may be further substituted by one or more selected from the group consisting of C1-C10alkyl, halogen, haloC1-C10alkyl, C1-C10alkoxy, C1-C10alkoxyC1-C10alkyl, C3-C10cycloalkyl, and C6-C20aryl;

A is $-(CR^aR^b)_m-$, C3-C10cycloalkylene, or C6-C20arylene, and the cycloalkylene or arylene may be further substituted by one or more selected from the group consisting of C1-C10alkyl, halogen, haloC1-C10alkyl, C1-C10alkoxy, C1-C10alkoxyC1-C10alkyl, C3-C10cycloalkyl, and C6-C20aryl;

$R^a$ and $R^b$ are independently of each other hydrogen, C1-C10alkyl, halogen, C1-C10alkoxy, C3-C10cycloalkyl, or C6-C20aryl, and the alkyl, alkoxy, cycloalkyl, or aryl may be further substituted by one or more selected from the group consisting of C1-C10alkyl, halogen, haloC1-C10alkyl, C1-C10alkoxy, C1-C10alkoxyC1-C10alkyl, C3-C10cycloalkyl, and C6-C20aryl; and m is an integer of 1 to 5.

2. The electrolyte for a secondary battery of claim 1, wherein the cyclic fluorophosphonate compound is a cyclic fluorophosphonate compound represented by the following Chemical Formula 2 or Chemical Formula 3:

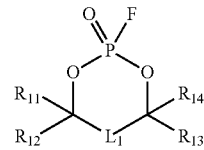

[Chemical Formula 2]

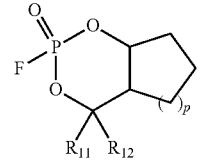

[Chemical Formula 3]

wherein
$R_{11}$, $R_{12}$, $R_{13}$, and $R_{14}$ are independently of one another hydrogen, C1-C10alkyl, or halogen, and the alkyl may be further substituted by one or more selected from the group consisting of halogen, C1-C10alkoxy, C3-C10cycloalkyl, and C6-C20aryl;

$L_1$ is $-(CR^cR^d)_n-$;

$R^c$ and $R^d$ are independently of each other hydrogen, C1-C10alkyl, or halogen, and the alkyl may be further substituted by one or more selected from the group consisting of halogen, C1-C10alkoxy, C3-C10cycloalkyl, and C6-C20aryl; and n is an integer of 0 to 3, and p is an integer of 1 to 3.

3. The electrolyte for a secondary battery of claim 1, wherein the cyclic fluorophosphonate compound is a cyclic fluorophosphonate compound represented by the following Chemical Formula 4:

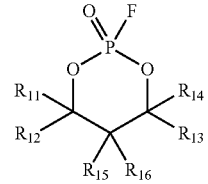

[Chemical Formula 4]

wherein

R$_{11}$ to R$_{16}$ are independently of one another hydrogen, C1-C7alkyl, halogen, or C1-C7alkoxyC1-C7alkyl.

4. The electrolyte for a secondary battery of claim 1, wherein the cyclic fluorophosphonate compound is one or more selected from the following structures:

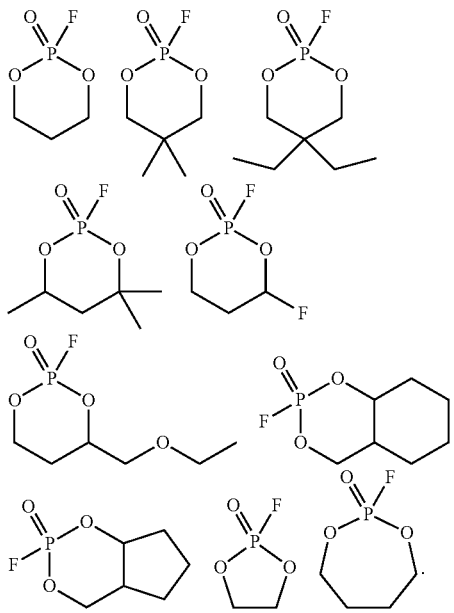

5. The electrolyte for a secondary battery of claim 1, wherein the cyclic fluorophosphonate compound is comprised at 0.1 to 5.0 wt %, based on a total weight of the electrolyte.

6. The electrolyte for a secondary battery of claim 1, further comprising: one or two or more additives selected from the group consisting of oxalatoborate-based compounds, oxalatophosphate-based compounds, fluorine-substituted carbonate-based compounds, vinylidene carbonate-based compounds, and sulfinyl group-containing compounds.

7. The electrolyte for a secondary battery of claim 1, wherein the nonaqueous organic solvent is selected from the group consisting of cyclic carbonate-based solvents, linear carbonate-based solvents, and mixed solvents thereof.

8. The electrolyte for a secondary battery of claim 7, wherein the nonaqueous organic solvent has a mixed volume ratio of a linear carbonate solvent to a cyclic carbonate solvent of 1:1 to 9:1.

9. A lithium secondary battery comprising: a cathode, an anode, and the electrolyte for a secondary battery of claim 1.

10. The lithium secondary battery of claim 9, wherein the cathode includes a composite metal oxide of at least one transition metal selected from the group consisting of cobalt, manganese, and nickel with lithium as a cathode active material.

11. The lithium secondary battery of claim 10, wherein the cathode active material is a lithium-nickel-cobalt-manganese-based composite oxide.

12. The lithium secondary battery of claim 11, wherein the lithium-nickel-cobalt-manganese-based composite oxide is Li$_x$(Ni$_a$Co$_b$Mn$_c$)O$_2$ ($0.5<x<1.3$, $0<a<1$, $0<b<1$, $0<c<1$, and $a+b+c=1$), Li$_x$(Ni$_a$Co$_b$Mn$_c$)O$_4$ ($0.5<x<1.3$, $0<a<2$, $0<b<2$, $0<c<2$, and $a+b+c=2$), or a mixture thereof.

13. The electrolyte for a secondary battery of claim 6, wherein the additive is comprised at 0.1 to 10.0 wt %, based on the total weight of the electrolyte.

14. The electrolyte for a secondary battery of claim 6, wherein the sulfinyl group-containing compound is one or two or more selected from the group consisting of sulfone-based compounds, sulfite-based compounds, sulfonate-based compounds, sultone-based compounds, and sulfate-based compounds.

15. The electrolyte for a secondary battery of claim 1, further comprising: two or more additives selected from the group consisting of fluorine-substituted carbonate-based compounds, vinylidene carbonate-based compounds, sultone-based compounds, and sulfate-based compounds.

* * * * *

UNITED STATES PATENT AND TRADEMARK OFFICE
CERTIFICATE OF CORRECTION

PATENT NO. : 12,218,306 B2
APPLICATION NO. : 16/703161
DATED : February 4, 2025
INVENTOR(S) : Sung Yon Oh Page 1 of 1

It is certified that error appears in the above-identified patent and that said Letters Patent is hereby corrected as shown below:

In the Claims

Column 24, Line 18, Claim 1, delete "1" and insert -- 2 --

Column 24, Line 52, Claim 2, delete "0" and insert -- 1 --

Column 25, Lines 27-31, In Claim 4, after " 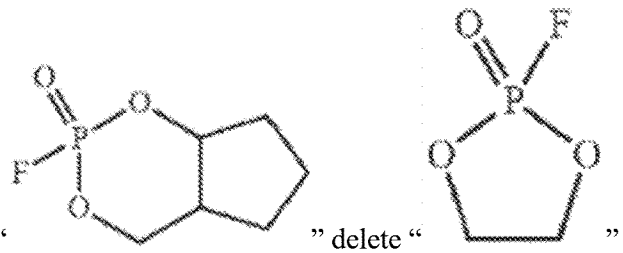 " delete " "

Signed and Sealed this
Thirteenth Day of May, 2025

Coke Morgan Stewart
*Acting Director of the United States Patent and Trademark Office*